US009654555B2

(12) United States Patent
Steiner et al.

(10) Patent No.: US 9,654,555 B2
(45) Date of Patent: *May 16, 2017

(54) METHOD FOR SYNCHRONIZING LOCAL CLOCKS IN A DISTRIBUTED COMPUTER SYSTEM

(71) Applicants: TTTech Computertechnik Aktiengesellschaft, Vienna (AT); Honeywell International Inc., Morristown, NJ (US)

(72) Inventors: Wilfried Steiner, Vienna (AT); Gunther Bauer, Vienna (AT); Matthias Wachter, Vienna (AT); Brendan Hall, Eden Prairie, MN (US); Michael Paulitsch, Columbia Heights, MN (US)

(73) Assignees: TTTech Computertechnik Aktiengesellschaft, Vienna (AT); Honeywell International Inc., Morristown, NJ (US)

(*) Notice: Subject to any disclaimer, the term of this patent is extended or adjusted under 35 U.S.C. 154(b) by 17 days.

This patent is subject to a terminal disclaimer.

(21) Appl. No.: 14/485,835

(22) Filed: Sep. 15, 2014

(65) Prior Publication Data
US 2015/0006760 A1 Jan. 1, 2015

Related U.S. Application Data

(63) Continuation of application No. 12/995,590, filed as application No. PCT/AT2008/000192 on Jun. 2, 2008, now Pat. No. 8,868,789.

(51) Int. Cl.
*G06F 15/16* (2006.01)
*H04L 29/08* (2006.01)
*H04J 3/06* (2006.01)

(52) U.S. Cl.
CPC ......... *H04L 67/1095* (2013.01); *H04J 3/067* (2013.01); *H04J 3/0664* (2013.01); *H04J 3/0673* (2013.01); *H04J 3/0641* (2013.01); *H04J 3/0679* (2013.01)

(58) Field of Classification Search
CPC ........ H04J 3/0644; H04J 3/0685; H04J 3/062; H04J 3/06; H04J 3/0682
See application file for complete search history.

(56) References Cited

U.S. PATENT DOCUMENTS 7,372,846 B2 * 5/2008 Zwack ..................... G06F 1/14
370/352
2003/0223422 A1 * 12/2003 Igarashi ............... H04L 1/1642
370/390

(Continued)

FOREIGN PATENT DOCUMENTS

EP   1 265 124 B1   5/2004
EP   0 986 202 B1   4/2006

OTHER PUBLICATIONS

Obermasser, Roman "Reuse of CAN-Vased Legacy Applications in Time-Triggered Architecture", IEEE Transactions on Industrial Informatics, Nov. 2006, pp. 255-268, vol. 2, No. 4.

(Continued)

*Primary Examiner* — Mohammed Waliullah
(74) *Attorney, Agent, or Firm* — Joseph E. Maenner; Maenner & Associates, LLC

(57) ABSTRACT

The invention relates to a method for synchronizing local clocks in a distributed computer network, where said computer network consists of a number of components that are connected to each other via bi-directional communication links, characterized in that
a) an a priori configured set of components of the network generates synchronization messages and sends these synchronization messages to the network, and
b) an a priori configured set of components consumes the generated synchronization messages, and (Continued)

c) one or more message-relaying components in between a component that generates a synchronization message and the component that consumes the synchronization message will add a delay value to the synchronization message reflecting the delay imposed by the message-relaying component, d) a component that is configured to consume a synchronization message will delay a received synchronization message upon reception for a duration that is calculated by an a priory configured value for the maximum transmission delay ("Maximum Transmission Delay") minus the value of the sum of all delay values added to the received message before further usage of the message in the synchronization process of said component.

18 Claims, 5 Drawing Sheets

(56) References Cited

U.S. PATENT DOCUMENTS

| | | |
|---|---|---|
| 2004/0133642 A1 | 7/2004 | Vazquez |
| 2005/0128950 A1* | 6/2005 | Hall ................. H04L 12/44 370/235 |
| 2006/0269028 A1* | 11/2006 | Bley ................. G01D 21/00 375/354 |
| 2008/0165699 A1* | 7/2008 | Wei ................. H04W 40/22 370/252 |
| 2009/0100196 A1 | 4/2009 | Jia |

OTHER PUBLICATIONS

PCT/AT2008/000192 Written Opinion, Dec. 2, 2010.
PCT/AT2008/000192 International Preliminary Report on Patentability, Dec. 6, 2010.
Kopetz, H. and Cohsenreiter, W., "Clock Synchronization in Distributed Real-Time systems", IEEE Transactions on Computers, vol. C-36, No. 8, Aug. 1987.
Schneider, Fred B., "A Paradigm for Reliable Clock Synchronization", Cornell University, Apr. 1986.
Srikanth, T.K. and Toueg, Sam, "Optimal Clock Synchronization", Journal of the ACM, vol. 34, No. 3, Jul. 1987, pp. 626-645.
Lamport, Leslie and Melliar-Smith, P.M., "Byzantine Clock Synchronization", ACM SIGOPS Operating Systems review, vol. 20, No. 3, pp. 10-16, 1986.
Kopetz, H. "Real-Time Systems", Kluwer Academic Publishers, 1997, pp. 108-110.

* cited by examiner

METHOD FOR SYNCHRONIZING LOCAL CLOCKS IN A DISTRIBUTED COMPUTER SYSTEM

CROSS REFERENCE TO RELATED APPLICATIONS

The present application is a continuation of U.S. patent application Ser. No. 12/995,590 (allowed), filed on Feb. 14, 2011, which is a U.S. National Stage Application of PCT Application Serial No. PCT/AT2008/000192, filed on Jun. 2, 2008 both of which are incorporated by reference in their entireties.

BACKGROUND OF THE INVENTION

The invention relates to synchronizing local clocks in a distributed computer network. Of particular interest are computer networks that exchange information via messages that are sent on communication links between components in the network. Without restriction to a specific realization of the invention we use standard Ethernet as an illustrating example. In standard Ethernet end systems are connected via network switches via bi-directional communication links. An end system will communicate with a second end system or a group of end systems via sending a message to the switch, which switch will then relay the message to the receiving end system or end systems. Likewise end systems can be connected directly to each other via bi-directional communication links, which makes a clear differentiation between end systems and switches in certain configurations difficult. Hence, generally we use the term component to refer to a physical device that can be either end system or switch. Whether a component is said to be an end system or said to be a switch is determined by its usage rather than its physical appearance.

The clock synchronization problem is the problem of bringing the local clocks of different components into close agreement.

For fault-tolerance reasons a multitude of components can be configured that generate synchronization messages. These components that generate the synchronization messages may be distributed with a high number of intermediate components in between each other. In an illustrating example of an Ethernet network that consists out of ten switches that are connected in sequence, the components that generate the synchronization messages may be located ten hops from each other. In standard Ethernet networks, the transmission latency and transmission jitter is a function of the number of hops between any two senders. This means that the receive order of synchronization messages is not necessarily the send order of these messages. For example an end system located at the same switch as an end system A that generates synchronization messages will receive the synchronization messages from end system A likely earlier than the synchronization messages from an end system B that is placed at a switch three hops away, although end system B sends its synchronization messages earlier. Likewise it can not be concluded that the synchronization messages from end systems in close proximity are always received earlier than those from end systems that are farther away, as in standard Ethernet networks, the buffer allocation in the switches is not fully predictable at runtime.

The problem of synchronizing local clocks has a long history and many algorithms that claim synchronization of local clocks also in presence of failures are known (*Byzantine clock synchronization*, Lamport, L. and Melliar-Smith, P. M., ACM SIGOPS Operating Systems Review, volume 20, number 3, p. 10-16, 1986, ACM New York, N.Y., USA; *Optimal clock synchronization*, Srikanth, T K and Toueg, S., Journal of the ACM (JACM), volume 34, number 3, p. 626-645, 1987, ACM New York, N.Y., USA; *A paradigm for reliable clock synchronization*, Schneider, F. B., Department of Computer Science Technical Report TR, p. 86-735; *Clock synchronization in distributed real-time systems*, Kopetz, H. and Ochsenreiter, W., IEEE Transactions on Computers, volume 36, number 8, p. 933-940, 1987, IEEE Computer Society Washington, D.C., USA).

These protocols, however, are developed with either an assumption of a fully connected point to point communication infrastructure between the components to be synchronized, or to operate in a contention-free environment. This invention specifies basic building blocks for synchronization protocols that operate in co-existence with other protocols on the same physical network infrastructure. We call such protocols transparent.

Well-known transparent protocols that allow the synchronization of local clocks in Ethernet-based Networks are for example the Network Time Protocol (NTP) or the IEEE 1588 clock synchronization protocol. These protocols, however, are not fault-tolerant in the sense of fault-masking, which means that no functional service degradation is experienced, once a component fails.

BRIEF SUMMARY OF THE INVENTION

The invention relates to basic building blocks that allow to transparently integrate a fault-tolerant synchronization protocol, in the sense of fault-masking as described above, on top of message-based communication infrastructures such as standard Ethernet. In particular, the invention allows extending the above mentioned non-fault-masking transparent protocols (NTP, IEEE 1588, etc.) via fault-masking capabilities. Likewise, new fault-masking synchronization protocols can be developed that integrate with the basic building blocks described in this invention with minimum integration overhead.

The invention relates to a method for synchronizing local clocks in a distributed computer network. The invention allows a transparent integration of fault-tolerant synchronization protocols on top of legacy communication protocols such as Ethernet. Fault-tolerance is understood as fail-operational, such that failures of components can immediately be masked, instead of executing a recovery procedure, as for example a leader election process.

The invention is based on following innovative steps.

Novel application of transparent clock mechanism that enables a novel concept of the Permanence Point in Time, and therefore re-establishment of the send order of messages in a receiver:

Application of transparent clock mechanism: all components in the distributed computer network that impose a dynamic delay on the transmission, reception, or relay of a synchronization message may add this dynamic delay into the synchronization messages used for the synchronization protocol.

Novel precise calculation of the Permanence Point in Time: the said application of transparent clock mechanism allows to re-establish temporal order of synchronization messages, by off-line calculating the overall worst-case transmission delay in the distributed computer system and delaying the synchronization message for the "worst case delay minus dynamic delay" where the dynamic delay is the delay added to the synchronization message, as the synchronization message flows through the communication channel. The point in time at "worst case delay minus dynamic delay" after the Reception Point in Time will be called the Permanence Point in Time.

The novel concept of Permanence Point in Time extends existing studies on message permanence done in H. Kopetz. *Real-Time Systems*. Kluwer Academic Publishers, 1997, p. 108-p. 110 in following ways:

In systems without a global time, or prior to establishment of a global time, the novel concept of Permanence Point in Time described in this invention allows precisely calculating the earliest point in time when a message becomes permanent, rather than defining worst-case upper bounds.

In a receiver the Permanence Points in Time of different messages reflect then the actual send order of these messages, instead of only guaranteeing permanence as introduced in H. Kopetz. *Real-Time Systems*. Kluwer Academic Publishers, 1997, p. 108-p. 110.

For fault-tolerant algorithms in general, and fault-tolerant synchronization algorithms in particular, the message send order is of highest importance. The re-establishment of the send order of synchronization messages is required for any fault-masking synchronization protocol that ensures synchronization of local clocks in a distributed computer network.

Novel concept of Compression Master:

The novel concept of Compression Master presents two grouping and compression functions, new Value Grouping function, that is used to construct a membership vector based on a set of messages received in temporal proximity, new Temporal Grouping function, that is used to generate a single new synchronization message out of a group of synchronization messages.

The novel concept of Compression Master reduces the number of synchronization messages that are transported in the communication network significantly and by doing so dramatically increasing the availability of a given network; and allows a re-integration of the Compression Master into a running system once, the Compression Master has lost synchronization.

BRIEF DESCRIPTION OF THE DRAWINGS

A preferred embodiment of the invention is hereafter described in detail with reference to the attached drawings.

DETAILED DESCRIPTION OF THE PRESENT INVENTION

Figure 1:
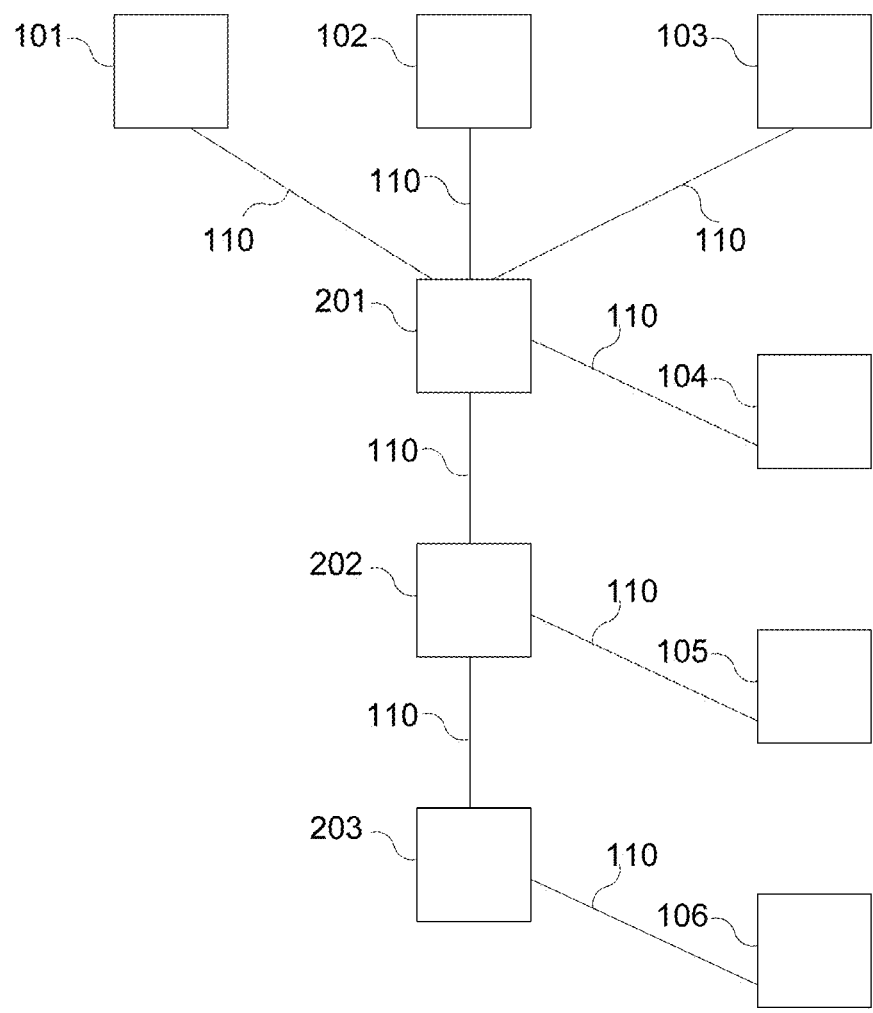
FIG. 1 depicts an example of a distributed computer network.

FIG. 1 depicts a distributed computer network consisting of 6 end systems 101-106 and 3 switches 201-203. Generally we use the term component to refer to a physical device 101-106, 201-203 that can be either an end system or a switch. Whether a component is said to be an end system 101-106 or said to be a switch 201-203 is determined by its usage rather than its physical appearance.

End systems are connected to switches via bi-directional communication links 110. Likewise switches are connected to each other via bi-directional communication links 110. We call switch 203 the Compression Master.

The set of end systems 101-106 generate synchronization messages that are consumed by switch 203 (set of consuming components). Once the end systems are synchronized, the end systems will dispatch the synchronization messages at the same a priori scheduled instant. Dispatch refers to an internal signal in an end system component, which indicates that a message is ready for transmission. The actual start of transmission of a message on the communication links 110 can be delayed. One reason for this delay is that there is another message already in transmission progress. The newly dispatched message will then be delayed until the transmission of the message in progress is finished on the communication links 110.

The components 101-106, 201-203 in the distributed computer network may cause dynamic transmission delays on the messages, and in particular synchronization messages, that are communicated:

The generator of the synchronization message may delay the transmission of the synchronization message to the network. As discussed above, the scheduled point in time of a synchronization message may occur when there is already another message in progress that blocks the communication link 110 to the network. Hence, the synchronization message transmission is delayed.

Intermediate components between the generating component and the consuming component can introduce transmission delay and transmission jitter. A synchronization message that is generated for example by end system 101 and consumed by switch 203 will be relayed by intermediate switches 201 and 202. There are also other components attached to the intermediate switches 201 and 202. The sending behavior of the other components attached to these switches may not be fully specified for several reasons. One reason can be that the components attached do not take part in the synchronization, but still use the same physical communication links 110 and switches 201-203 for message exchange. In this case it may happen that the outgoing link from switch 201 to switch 202 is already busy, when a synchronization message arrives. This synchronization message has to be delayed until the communication link is idle again. The invention allows that this delay is compensated for as long as an upper bound on the delay can be specified.

The consumer of the synchronization message may delay the reception of the synchronization message. Following hardware restrictions it can be necessary that the reception of messages is sequentialized with other internal actions of the consuming component. This additional delay is compensated for by adding the delay to the message again.

Additionally to the dynamic transmission delays, the messages are also affected by static transmission delays. The static delays, however, are a priori known and can be compensated in the receiver of a message statically as well. This can be done for example by correcting the Reception Point in Time of a given message by an a priori configured parameter. If the static delays are compensated as well, this invention refers to this already correct Reception Point in Time as the reception of a message.

The compensation of static transmission delays is common engineering practice. Hence, this invention focuses at the compensation of dynamic transmission delays.

Figure 2:
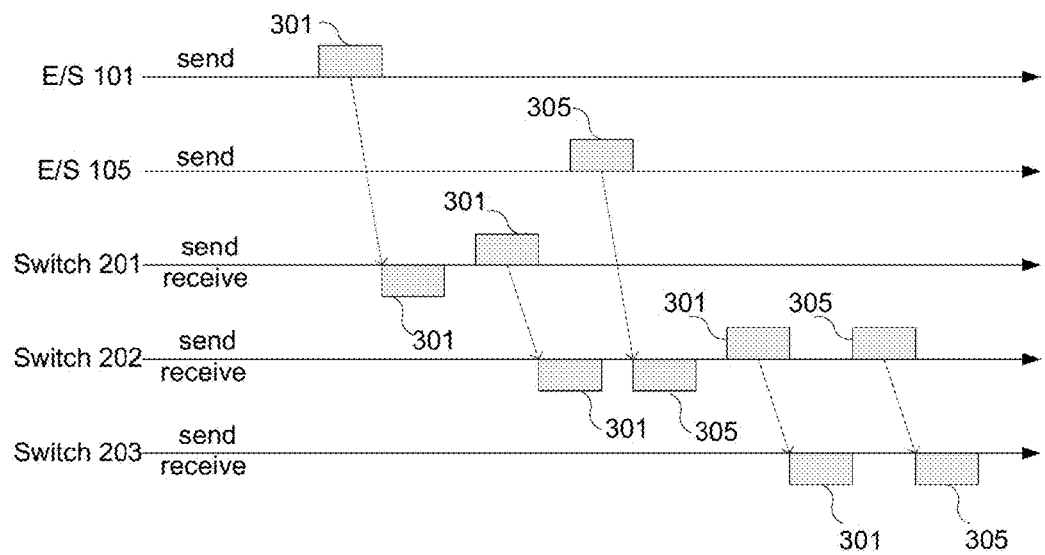
FIG. 2 depicts an example of message flow in a distributed computer network in which the receive order in a receiver is the same as the send order of the messages.

FIG. 2 depicts a sequence of synchronization messages transmissions where the send order of the messages 301 and 305 is equal to the receive order of the messages 301 and 305 in switch 203. The figure presents the progress in real-time from left to right.

The sequence is started with end system (E/S) 101 sending a synchronization message 301 to switch 201.
Switch 201 forwards message 301 to switch 202.
Switch 202 receives message 301.
End system 105 sends a message 305 to switch 202.
Switch 202 receives message 305.
Switch 202 forwards message 301 to switch 203.
Switch 202 forwards message 305 to switch 203.
Switch 203 receives message 301 before message 305.

Figure 3:
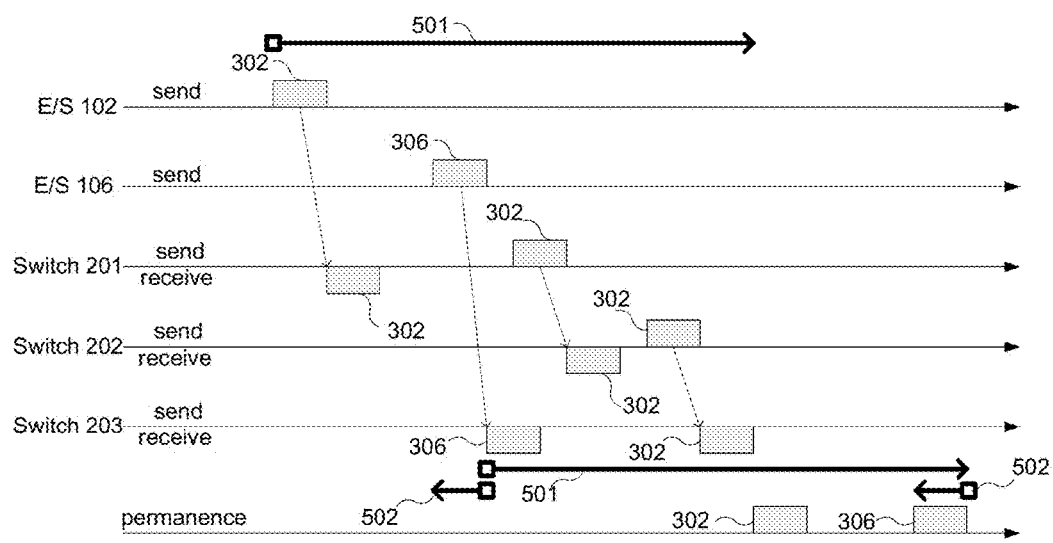
FIG. 3 depicts an example of message flow in a distributed computer network, in which the receive order in a receiver is different to the send order of the messages and where the send order is re-established by a permanence function.

FIG. 3 depicts a sequence of synchronization messages transmissions where the send order of the messages 302 and 306 is different than the receive order of the messages 302 and 306 in the switch 203. Also this figure shows how the permanence function reestablishes temporal order in the receiver. The figure presents the progress in real-time from left to right:

End system 102 sends message 302 to switch 201.
Switch 201 receives message 302.
End System sends message 306 to switch 203.
Switch 203 receives message 306.
Switch 201 forwards message 302 to switch 202.
Switch 202 receives message 302.
Switch 202 forwards message 302 to switch 203.
Switch 203 receives message 302.

This sequence shows that message 306 is received in switch 203 significantly before message 302 is received in switch 203. In order to re-establish the temporal send order of message 302 and 306 in the switch 203 message 302 and 306 will be declared as permanent once they are delayed after the reception in switch 203 for a duration that is equal to:

Permanence Delay=Maximum Transmission Delay
501–Transparent Clock Delay 502

In one realization the Maximum Transmission Delay 501 is equal for all messages in the system. The Transparent Clock Delay 502 is the cumulated delay written in the messages 302 and 306 (in the Transparent clock field 406) while the messages 302 and 306 flow from component to component.

The term "permanence" is associated with a single message and refers to a point in time from which on this message can be used by a receiver with a guarantee that the receiver will not receive another message after this point in time that has been sent prior to said first message.

In the depicted scenario in FIG. 3, the Transparent Clock Delay in message 302 is equal to the Maximum Transmission Delay 501, which means that message 302 becomes permanent immediately after reception in switch 203. The value of the Transparent Clock Delay 406 in message 306 is depicted by 502. As a result of the permanence function, message 306 will be delayed and the order of messages 302 and 306 in switch 203 after the permanence function is applied is the same order as the send order of the messages 302 and 306. This re-established send order is exact in a sense that the relative offsets between any two permanent messages is equal to the relative offsets between the messages when sent from the original senders (despite the drift of the local oscillators).

Figure 4:
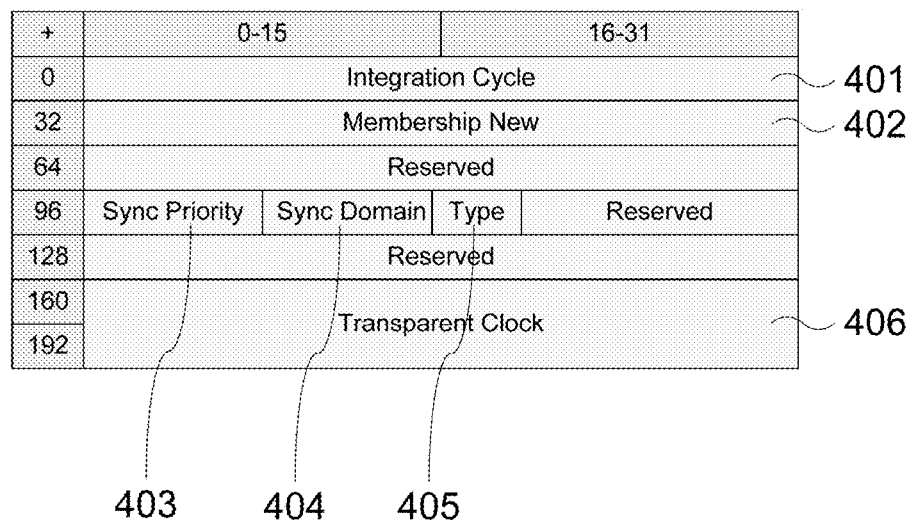
FIG. 4 depicts an example of the data structure for synchronization messages.

FIG. 4 depicts an example of the data structure for synchronization messages. In one realization the field Integration Cycle 401 is used to indicate a position in a time-triggered communication schedule. In one realization the Membership New field 402 is used to indicate the sender of the respective message. In one realization the Sync Priority field 403 is used to realize a priority mechanism on synchronization messages. In one realization the Sync Domain field 404 is used to realize independent sets of components that are synchronized to each other: synchronization messages for components in different independent sets will have different values assigned to the Sync Domain field 404. In one realization the Type field 405 is used to realize different synchronization message types: typical synchronization protocols use different types to differentiate synchronization messages that are used upon power-up from synchronization messages that are executed once synchronization beyond components is established. In one realization the Transparent Clock field 406 is used to track the dynamic delay imposed by end systems and switches while the message traverses through a distributed computer network. In one realization, each component that causes a delay on the message will add this delay to the value in the Transparent Clock field 406.

Figure 5:
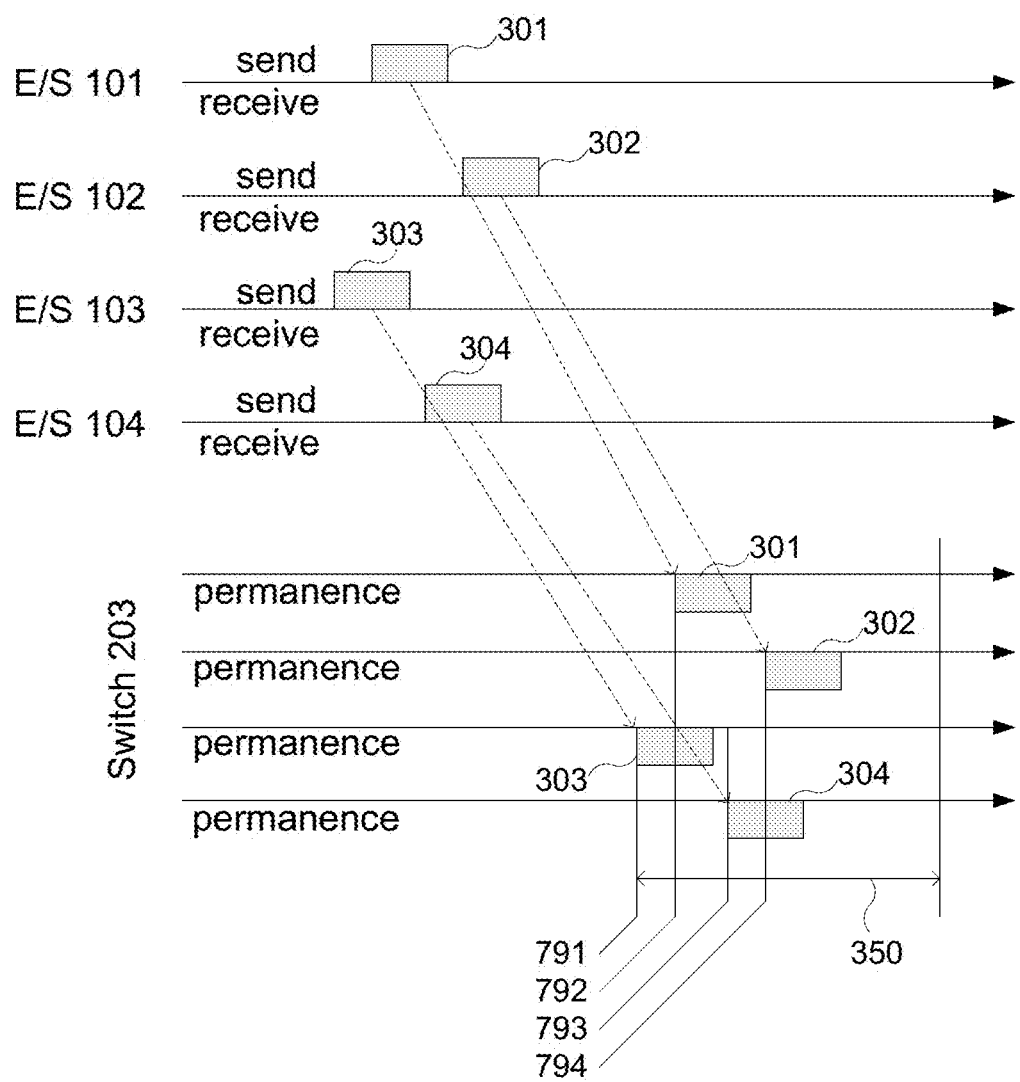
FIG. 5 gives an overview the collection and compression method executed in a Compression Master.

FIG. 5 gives an overview the collection and compression method executed in a Compression Master.

The collection/compression function is executed to collect and compress synchronization messages 301-304 that are dispatched by the end systems 101-104 at the same scheduled point in time. Due to differences in the local oscillators in the different end systems the actual dispatch points in time will be slightly different as well. The collection/compression function collects synchronization messages 301-304 that have the same scheduled dispatch point in time and generates an average of the individual divergences of the actual dispatch points in time. This collection/compression is done in a fault-tolerant manner: the collection window duration 350 is a function of the number of synchronization messages received and their permanence point in times 791-794. The permanence function as depicted in FIG. 3 ensures that dynamic delays introduced on the transmission paths are compensated, such that the permanence point in times 791-794 reflect the relative differences from the individual actual dispatch points in time.

Figure 6:
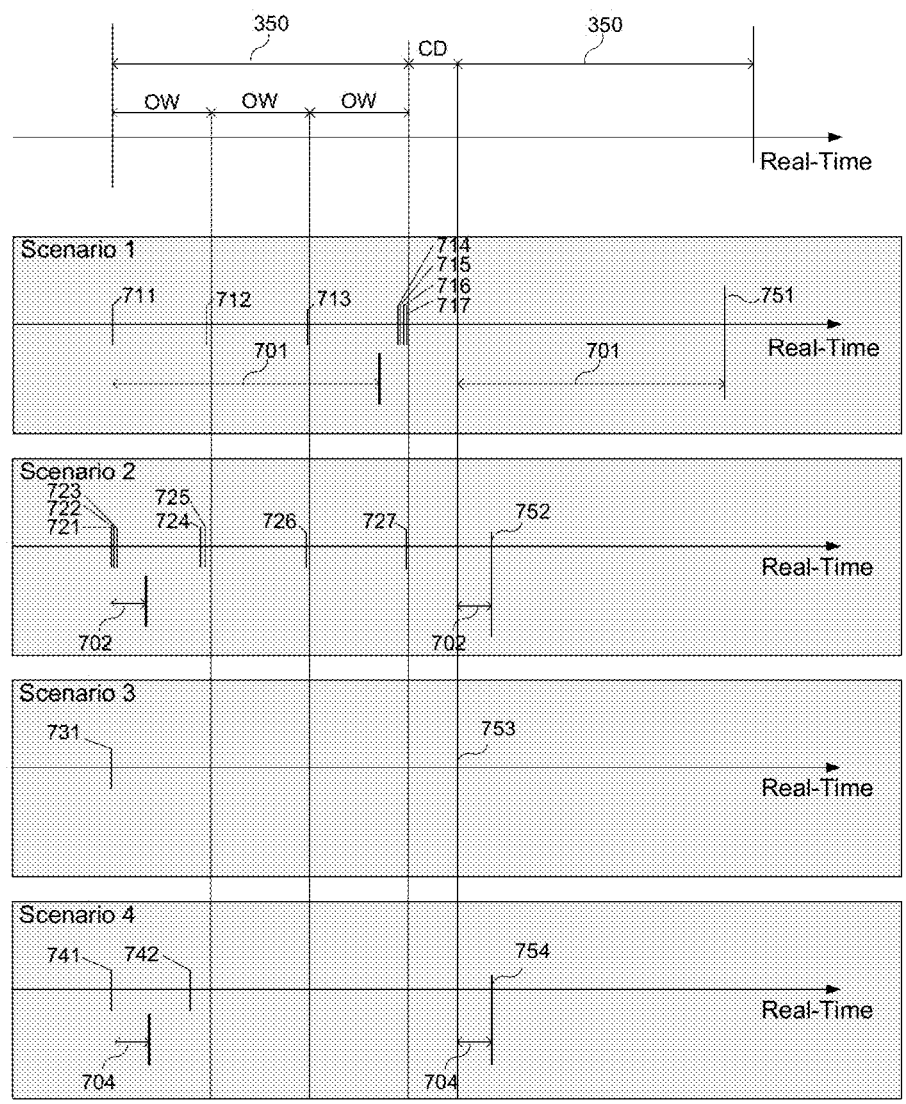
FIG. 6 depicts the collection and compression function in detail.

FIG. 6 depicts the collection and compression function in detail. The figure depicts a realization of the collection/compression function with a maximum observation time 350 of three times an observation window OW. This configuration is able to tolerate up to two faulty end systems. In general the maximum observation time 350 is given by the following formula:

Maximum observation time $350=(f+1)*observation\ window\ OW$ where f is the number of faulty end systems that have to be tolerated.

A new collection process is started when a synchronization message becomes permanent (depicted by 711 in Scenario 1 and by 721 in Scenario 2 and by 731 in Scenario 3) and no collection process is already active for this synchronization message. In one realization concurrent collection/compression processes can be active where a synchronization message is associated with a particular collection/compression process based on the Sync Priority field 403 in a synchronization message.

When a new collection process is started the collection process will be active for an observation window OW with an off-line specified duration. In one realization OW is equal to the precision in a given system, where the precision is the maximum deviation of any two correct synchronized local clocks in the system.

At the end of the first observation window OW, the number of permanent synchronization messages is checked, if this number is greater than one, then a second observation window OW is started and the collection process continues (e.g. Scenario 1 and Scenario 2). If the number of permanent synchronization messages is one than the collection process is finished and considered not active (e.g. Scenario 3).

At the end of the second observation window OW, the number of permanent synchronization messages received is checked again: if during the second observation window OW at least one permanent synchronization message has been received then the third observation window will be started and the collection process continues (e.g. Scenario 1 and Scenario 2). If during the second observation window OW no permanent synchronization message is received than the collection process is finished and considered not active (e.g. Scenario 4).

At the end of the third observation window OW the collection process is finished latest (for the described two fault-tolerance case). For fault-tolerance beyond two fault-tolerance the check is as follows: when number of received permanent synchronization messages at the end of observation window OW i+1 is higher than the number of received permanent synchronization messages at the end of observation window OW i then continue collection process, else end the collection process. In any case the collection process is finished at the end of the (f+1)-th observation window OW.

When the collection process is finished the temporal compression process calculates a fault-tolerant average value (Scenario 1: 701, Scenario 2: 702, Scenario 3: 0, Scenario 4: 704) from the relative distances of the individual permanence points in time (Scenario 1: 712-717, Scenario 2: 722-727, Scenario 3: none, Scenario 4: 742) from the synchronization messages to the permanence point in time of the first synchronization message (Scenario 1: 711, Scenario 2: 721, Scenario 3: 731, Scenario 4: 741). The calculation duration CD of this fault-tolerant average can be calculated offline and accounted for as static delay.

The temporal compression process will signal the compression to be complete at

Maximum Observation Time 350+Calculation Delay $CD$+ft average 701-704 after the reception of the first permanent synchronization message 711, 721, 731, 741. These points in time are depicted in FIG. 6 as 751-754 ("message compressed points in time").

The signal of compression to be completed at 751-754 can be used as dispatch point in time of a new synchronization message from the Compression Master in switch 203 to the end systems 101-106 and switches 201-202 in the distributed computer network according to FIG. 1. The value compression process will set bits in the Membership New field 402 in this new synchronization message for those end systems that sent a synchronization message and which respective permanence points in time (Scenario 1: 711-717, Scenario 2: 721-727, Scenario 3: 731, Scenario 4: 741-742) have been collected by the collection process.

The invention claimed is:

1. A method for synchronizing local clocks in a distributed computer network, where said computer network comprises a number of components that are connected to each other via bi-directional communication links, characterized in that a) an a priori configured set of at least one generating component of the network generates synchronization messages and sends the synchronization messages to the network;

b) an a priori configured set of at least one consuming component consumes the synchronization messages;

c) one or more message-relaying components in between the at least one generating component and the at least one consuming component will add a delay value to the synchronization messages reflecting a delay imposed by the one or more message-relaying components; and d) each of the at least one consuming component will delay the synchronization messages upon reception by the at least one consuming component for a duration that is calculated by an a priori configured value for the maximum transmission delay ("Maximum Transmission Delay") minus the value of the sum of all delay values added to the synchronization messages before further usage of the synchronization messages in the synchronization process of the consuming component, wherein an a priori defined set of one or more components that consume synchronization messages is configured to act as a so-called Compression Master, and wherein one or more Compression Masters are provided in the network, and wherein said Compression Master groups a multitude of received synchronization messages and generates a new synchronization message from the grouped received synchronization messages, and sends the generated synchronization message to some of its attached communication links.

2. The method according to claim 1, wherein a component that is configured to consume a synchronization message may concurrently delay a multitude of received synchronization messages.

3. The method according to claim 1, wherein delay values added to a synchronization message are written to the Transparent Clock Delay Field of said message.

4. The method according to claim 1, wherein the component that adds the value for the delay to the synchronization message is the component that generates said synchronization message.

5. The method according to claim 1, wherein the component that adds a the value for the delay to the synchronization message is one component or a multitude of intermediate components in between the component that generates the synchronization message and the component that consumes the synchronization message.

6. The method according to claim 1, wherein the component that adds a delay value to the synchronization message is the component that is configured to consume the synchronization message.

7. The method according to claim 1, wherein each Compression Master calculates a message compressed point in time from one or more permanence points in time, that is when the received synchronization messages have finished said delay process.

8. The method according to claim 7, wherein each Compression Master dispatches the new generated synchronization message to be transmitted on some communication links a configurable offset after the message compressed point in time.

9. The method according to claim 7, wherein each Compression Master adds the delay value between the dispatch of the new generated synchronization message and the actual transmission point in time of this synchronization message to a communication link to the synchronization message.

10. The method according to claim 1, wherein each Compression Master adds to the newly generated synchronization message the information which components generated the synchronization messages used to generate the new synchronization message.

11. The method according claim 10, wherein the information on which components generated the synchronization messages used to generate the new synchronization message in the Compression Master is a bit-vector with an a priori one-to-one mapping from bits to components.

12. The method according to claim 1, wherein each Compression Master
   starts a grouping process when the Compression Master receives a permanent synchronization message with an Integration Cycle Field where no grouping process is already started, and;
   ends a grouping process at after the duration of an observation window after the start of the grouping process if the number of received permanent synchronization messages is "1", and;
   ends a grouping process at "n+1" times of the duration of the observation window after the start of the grouping process (for n>0) when the number of received permanent synchronization messages at (n+1 times the duration of the observation window) is equal to the number of received permanent synchronization messages at (n times the duration of the observation window), this means if during the last observation window no more permanent synchronization message with matching Integration Cycle Field is received; and
   ends a grouping process at "f" times of the duration of the observation window latest, where "f" is a configurable parameter.

13. The method according to claim 1, wherein each Compression Master starts the grouping process only for received permanent synchronization processes which are received with an upper bound from an expected arrival point in time to the local clock of the Compression Master.

14. The method according to claim 1, wherein each Compression Master uses a fault-tolerant convergence function for the calculation the message compressed point in time.

15. The method according to claim 1, wherein each Compression Master is realized as a high-integrity component.

16. The method according to claim 1, further comprising the step of:
   e) each of the at least one consuming component will not relay the synchronization message after step d).

17. A communication network comprising:
   a) an a priori configured set of at least one generating component of the network configured to generate synchronization messages and to send the synchronization messages to the network;
   b) an a priori configured set of at least one consuming component configured to consume the synchronization messages;
   c) one or more message-relaying components in between the at least one generating component and the at least one consuming component configured to add add a delay value to the synchronization messages reflecting a delay imposed by the one or more message-relaying components;
   wherein each of the at least one consuming component is configured to delay the synchronization messages upon reception by the at least one consuming component for a duration that is calculated by an a priori configured value for the maximum transmission delay ("Maximum Transmission Delay") minus the value of the sum of all delay values added to the synchronization messages before further usage of the synchronization messages in the synchronization process of the consuming component,
   wherein an a priori defined set of one or more components that consume synchronization messages is configured to act as a so-called Compression Master, and wherein one or more Compression Masters are provided in the network, and wherein said Compression Master groups a multitude of received synchronization messages and generates a new synchronization message from the grouped received synchronization messages, and sends the generated synchronization message to some of its attached communication links.

18. The communication network according to claim 17, wherein said components are connected to each other via bi-directional communication links.

* * * * *